United States Patent [19]

Matsuoka et al.

[11] Patent Number: 5,303,156
[45] Date of Patent: Apr. 12, 1994

[54] ELECTRIC POWER STEERING APPARATUS HAVING OVERLOAD PROTECTION

[75] Inventors: Hirofumi Matsuoka, Souraku; Hidetoshi Tabuse, Wakayama, both of Japan

[73] Assignee: Koyo Seiko Co., Ltd., Osaka, Japan

[21] Appl. No.: 910,696

[22] Filed: Jul. 8, 1992

[30] Foreign Application Priority Data

Jul. 10, 1991 [JP] Japan ............... 3-061682[U]

[51] Int. Cl.$^5$ ............................................. B62D 5/04
[52] U.S. Cl. ............................ 364/424.05; 180/79.1; 361/23; 361/30; 361/88; 318/434
[58] Field of Search ................ 364/424.05; 361/23, 361/30, 31, 33, 78, 79, 90, 93; 318/432, 433, 434

[56] References Cited

U.S. PATENT DOCUMENTS

| | | | |
|---|---|---|---|
| 4,719,396 | 1/1988 | Shimizu | 318/432 |
| 4,756,375 | 7/1988 | Ishikura et al. | 180/79.1 |
| 4,765,426 | 8/1988 | Shimizu | 180/79.1 |
| 4,940,102 | 7/1990 | Morishita | 180/79.1 |
| 4,945,298 | 7/1990 | Nakashima | 318/635 |
| 4,957,182 | 9/1990 | Morishita et al. | 180/79.1 |
| 4,985,666 | 1/1991 | Nakabayashi | 318/434 |
| 5,000,278 | 3/1991 | Morishita | 180/79.1 |
| 5,150,021 | 9/1992 | Kamono et al. | 318/488 |

FOREIGN PATENT DOCUMENTS 1278882  7/1991  Japan .

*Primary Examiner*—Thomas G. Black
*Assistant Examiner*—Julie D. Day
*Attorney, Agent, or Firm*—Darby & Darby

[57] ABSTRACT

In an electric power steering apparatus which assists a steering power by an electric motor, the difference between currents flowing into and flowing out from the electric motor is obtained, and an abnormality of the electric motor due to a ground fault is detected on the basis of this difference. When a state in which this difference is greater than a given value has continued for a predetermined period of time, the abnormality of the electric motor is detected. Upon the detection of the abnormality of the electric motor, a relay contact of a fail-safe relay circuit is made off so that the supply of electric power from a main power supply to the electric motor is cut off, thereby inhibiting the electric motor from assisting the steering power.

20 Claims, 8 Drawing Sheets

ELECTRIC POWER STEERING APPARATUS HAVING OVERLOAD PROTECTION

BACKGROUND OF THE INVENTION

1. Field of the Invention

This invention relates to an electric power steering apparatus which assists the power required for the steering operation of an automobile.

2. Description of the Related Art

An electric power steering apparatus has been developed in which a steering torque acting on a steering wheel is detected, a driving current the value of which is set depending upon the detected torque is supplied to a DC motor for assisting the steering operation to drive it, so that the turning force of the DC motor assists the power required for the steering operation of an automobile, thereby providing a driver with a comfortable feeling of steering. In such an electric power steering apparatus, a driving circuit for the DC motor is composed of a bridge circuit consisting of four power transistors.

FIG. 1 is a schematic block diagram illustrating the configuration of a control system of a conventional electric power steering apparatus. In the figure, reference numeral 1 designates a DC motor for assisting the steering operation, and the DC motor 1 is driven by a motor driving circuit 2. The motor driving circuit 2 is composed of a bridge circuit consisting of two forward rotation power transistors 20a and 20b and two reverse rotation power transistors 20c and 20d which function as switching elements. The forward rotation power transistor 20a and reverse rotation power transistor 20d are connected in series, the reverse rotation power transistor 20c and forward rotation power transistor 20b are connected in series, and the two series circuits are connected in parallel. The DC motor 1 is connected between the node of the forward rotation power transistor 20a and reverse rotation power transistor 20d and that of the reverse rotation power transistor 20c and forward rotation power transistor 20b.

The collector of the forward rotation power transistor 20a and that of the reverse rotation power transistor 20c are connected to a main power supply 5 through a current detection resistor 8 and a fail-safe relay circuit 6. On the other hand, the emitter of the forward rotation power transistor 20b and that of the reverse rotation power transistor 20d are coupled to ground via a current detection resistor 9. The bases of the forward rotation power transistors 20a and 20b and reverse rotation power transistors 20c and 20d are coupled to a control unit 7. The fail-safe relay circuit 6 comprises a relay contact (not shown) which in its ON state supplies the electric power from the main power supply 5 to the motor driving circuit 2 and in its OFF state shuts off the supply of electric power. The operation of the relay contact is controlled by the control unit 7. The current detection resistor 8 is coupled to an over-current detection circuit 80 which detects a current flowing into the motor driving circuit 2 and supplies the detection result to the control unit 7. Similarly the current detection resistor 9 is coupled to a current detection circuit 90 which detects a current flowing through the DC motor 1 and supplies the detection result to the control unit 7.

The control unit 7 comprises a microcomputer and a PWM modulation circuit. The microcomputer performs a control of the degree of assisting the steering operation in which the degree of assisting the steering operation for the DC motor 1 is calculated on the basis of the detection results of a torque sensor and a speed sensor (both are not shown), and also a fail-safe control in which the relay contact of the fail-safe relay circuit 6 is made into the OFF state when an abnormality in the torque sensor, the speed sensor, the motor driving circuit 2, etc. is detected. The PWM modulation circuit generates a PWM output (hereinafter, referred to as "PWM signal") corresponding to the degree of assisting the steering operation which has been obtained by the microcomputer.

The operation of the thus configured electric power steering apparatus will be described. When the DC motor 1 is to be forward rotated, the PWM signal for controlling the motor which is outputted from the PWM modulation circuit is applied to the base of the forward rotation power transistor 20a, and a continuous signal for controlling the motor by which the forward rotation power transistor 20b is continuously turned on is applied to the base of the forward rotation power transistor 20b. In this case, therefore, each time when the forward rotation power transistor 20a is turned on in response to the PWM signal, a current flows through the main power supply 5, the fail-safe relay circuit 6, the current detection resistor 8, the forward rotation power transistor 20a, the DC motor 1, the forward rotation power transistor 20b and the current detection resistor 9, in this sequence, so that the DC motor 1 is driven to forward rotate. In contrast, when the DC motor 1 is to be reversely rotated, the PWM signal outputted from the PWM modulation circuit is applied to the base of the reverse rotation power transistor 20c, and a continuous signal for controlling the motor by which the reverse rotation power transistor 20d is continuously turned on is applied to the base of the reverse rotation power transistor 20d. In this case, therefore, each time when the reverse rotation power transistor 20c is turned on in response to the PWM signal, a current flows through the main power supply 5, the fail-safe relay circuit 6, the current detection resistor 8, the reverse rotation power transistor 20c, the DC motor 1, the reverse rotation power transistor 20d and the current detection resistor 9, in this sequence, so that the DC motor 1 is driven to reversely rotate. In the both cases, the driving force is regulated by the duty ratio of the PWM signal.

When a ground fault occurs for example in the DC motor 1 while a current flows through the DC motor 1, however, a large current flows through the DC motor 1 so that the assisting steering force of the degree which is greater than the driver's intention is exerted, resulting in a dangerous steering state. In this way, the flow of a large current caused by the ground fault of the DC motor 1 increases the current flowing into the motor driving circuit 2. In order to prevent a dangerous steering state due to this large current from occurring, the control unit 7 monitors the detection result of the over-current detection circuit 80 to determine whether or not it exceeds a given value. When the state wherein the detection result exceeds the given threshold threshold value continues for a predetermined period of time, the control unit 7 performs a fail-safe control in which the relay contact of the fail-safe relay circuit 6 is made into the OFF state so that the supply of electric power to the motor driving circuit 2 is cut off, thereby forcibly stopping the DC motor 1.

FIG. 2 is a graph illustrating the variation of current value which is detected by the overcurrent detection circuit 80 when a ground fault occurs in the DC motor 1. The graph in which detected current value is plotted as ordinate and the elapsed time as abscissa shows the relationship between them. In FIG. 2, a ground fault of the DC motor 1 occurs at time $t_1$, and after the occurrence of the ground fault the current flowing through the DC motor 1 increases in the manner of time-lag of first order in accordance with the electrical time constant of the DC motor 1 and reaches the given threshold value A at time $t_4$. When the current value continues to be equal to or greater than the given threshold value A for the predetermined period of time, i.e. at time $t_5$, the fail-safe control is performed.

In a conventional electric power steering apparatus such as described above, however, a large current which is caused by a ground fault and flows through the DC motor 1 increases in the manner of time-lag of first order in accordance with the electrical time constant of the DC motor 1, and therefore it requires a considerable period of time for the current to reach the given threshold value A. When the detection of a ground fault consumes a period of time longer than required in this way, the period of time during which the assisting steering force of the degree which is greater than the driver's intention is exerted is extended correspondingly, thereby causing a problem in that a dangerous steering state continues for a long period of time.

SUMMARY OF THE INVENTION

It is an object of the invention to provide an electric power steering apparatus which can detect in a short period of time a ground fault caused in an electric motor for assisting the steering operation.

It is another object of the invention to provide an electric power steering apparatus which has a short detection period of time for a ground fault and hence ensures high security.

The electric power steering apparatus according to the invention comprises: means for detecting a current flowing into an electric motor; means for detecting a current flowing out from the electric motor; means for obtaining the difference between the currents detected by these means; means for detecting an abnormal state (a ground fault caused in the electric motor) on the basis of the obtained current difference; and means for, when the abnormal state is detected, inhibiting the electric motor from assisting the steering power.

When a ground fault occurs in the electric motor, the current flowing into the electric motor increases in the manner of time-lag of first order in accordance with the electrical time constant of the electric motor, and the current flowing out from the electric motor rapidly decreases to approximately zero. According to the invention, the difference between the current flowing into the electric motor and that flowing out therefrom is obtained, and an abnormal state of the electric motor due to the ground fault is detected on the basis of this difference. More specifically, when this difference exceeds a given value, it is judged that an abnormal state of the electric motor due to a ground fault has occurred. When the detection of an abnormal state of the electric motor is performed on the basis of the difference between the current flowing into the electric motor and that flowing out therefrom in this way, an abnormal state of the electric motor due to a ground fault can be detected in a short period of time because the current flowing out from the electric motor rapidly decreases and hence that difference becomes large in a short period of time. According to the invention, moreover, it is also possible to detect faults caused in portions other than the electric motor, namely, a fault in a motor driving circuit such as that caused in terminals of resistors which function as the means for detecting a current flowing into the electric motor and the means for detecting a current flowing out from the electric motor, and that caused in signal wires which are extended between the means for detecting a current flowing into the electric motor and that for detecting a current flowing out from the electric motor and the means for detecting an abnormal state.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings illustrating embodiments.

Figure 3:
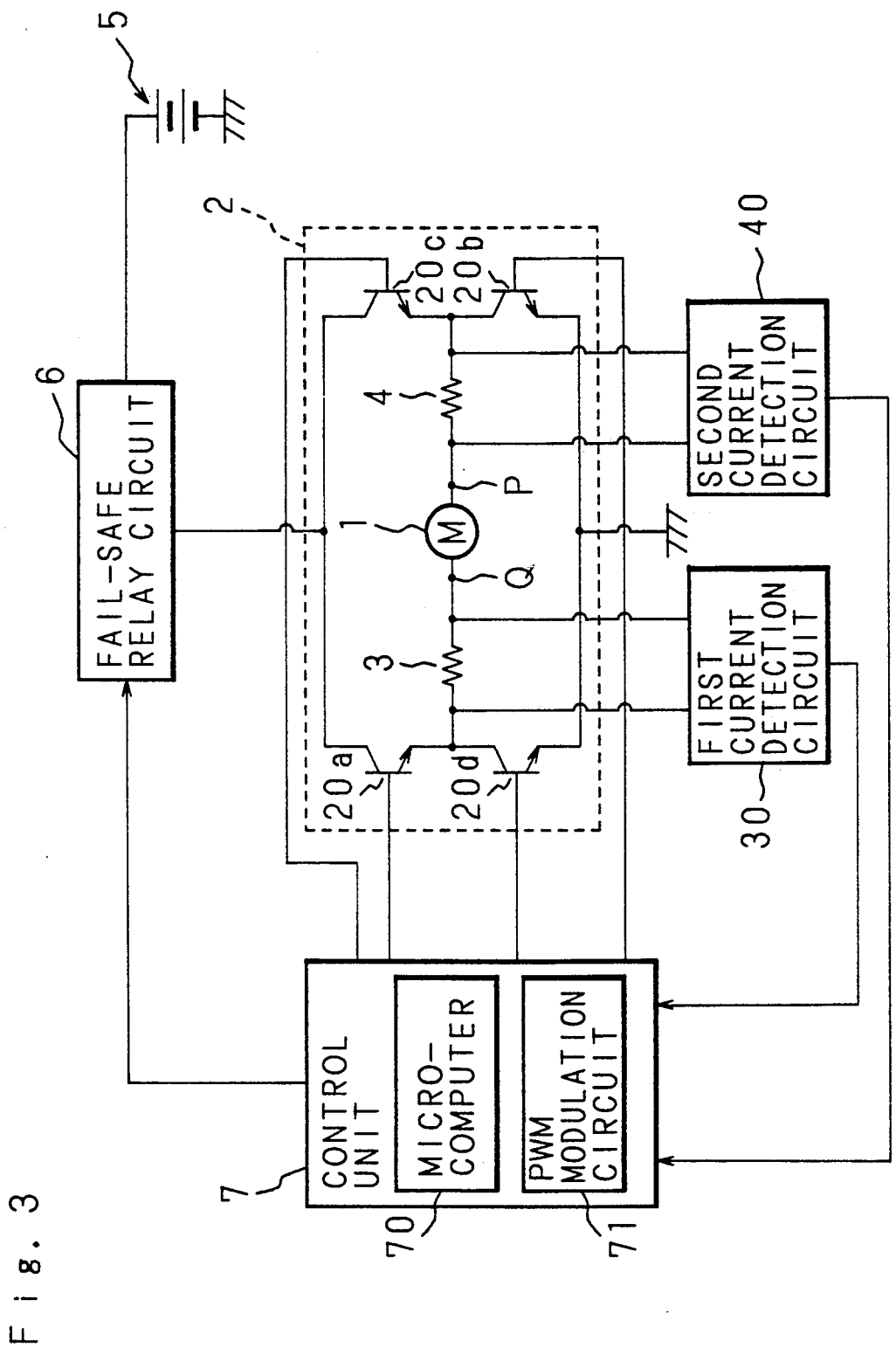
FIG. 3 is a schematic block diagram illustrating the configuration of a control system of an electric power steering apparatus according to the invention.

FIG. 3 is a schematic block diagram illustrating the configuration of a control system of an electric power steering apparatus according to the invention. In the figure, reference numeral 1 designates a DC motor for assisting the steering operation which is driven by a motor driving circuit 2. The motor driving circuit 2 is composed of a bridge circuit consisting of two forward rotation power transistors 20a and 20b and two reverse rotation power transistors 20c and 20d which function as switching elements. The forward rotation power transistor 20a and reverse rotation power transistor 20d are connected in series, the reverse rotation power transistor 20c and forward rotation power transistor 20b are connected in series, and the two series circuits are connected in parallel. The node of the forward rotation power transistor 20a and reverse rotation power transistor 20d is connected to the DC motor 1 through a first current detection resistor 3, and the node of the reverse rotation power transistor 20c and forward rotation power transistor 20b is connected to the DC motor 1 through a second current detection resistor 4.

The collector of the forward rotation power transistor 20a and that of the reverse rotation power transistor 20c are connected to a main power supply 5 through a fail-safe relay circuit 6. On the other hand, the emitter of the forward rotation power transistor 20b and that of the reverse rotation power transistor 20d are coupled to ground. The bases of the forward rotation power transistors 20a and 20b and reverse rotation power transistors 20c and 20d are coupled to a control unit 7. The fail-safe relay circuit 6 comprises a relay contact (not shown) which in its ON state supplies the electric power from the main power supply 5 to the motor driving circuit 2 and in its OFF state shuts off the supply of electric power. The operation of the relay contact is controlled by the control unit 7.

The first current detection resistor 3 is coupled to a first current detection circuit 30 which detects a current flowing into or out from the DC motor 1 and supplies the detection result to the control unit 7. Similarly the second current detection resistor 4 is coupled to a second current detection circuit 40 which detects a current flowing into or out from the DC motor 1 and supplies the detection result to the control unit 7.

The control unit 7 comprises a microcomputer 70 and a PWM modulation circuit 71. The microcomputer 70 performs a control of the degree of assisting the steering operation in which the degree of assisting the steering operation for the DC motor 1 is calculated on the basis of the detection results of a torque sensor and a speed sensor (both are not shown), and also a fail-safe control in which the relay contact of the fail-safe relay circuit 6 is made into the OFF state when an abnormality in the torque sensor, the speed sensor, the motor driving circuit 2, etc. is detected. The PWM modulation circuit 71 generates a PWM output (hereinafter, referred to as "PWM signal") corresponding to the degree of assisting the steering operation which has been obtained by the microcomputer 70.

The operation of the control system of the thus configured electric power steering apparatus will be described. When the DC motor 1 is to be forward rotated, the PWM signal for controlling the motor which is outputted from the PWM modulation circuit 71 is applied to the base of the forward rotation power transistor 20a, and a continuous signal for controlling the motor by which the forward rotation power transistor 20b is continuously turned on is applied to the base of the forward rotation power transistor 20b. In this case, therefore, each time when the forward rotation power transistor 20a is turned on in response to the PWM signal, a current flows through the main power supply 5, the fail-safe relay circuit 6, the forward rotation power transistor 20a, the first current detection resistor 3, the DC motor 1, the second current detection resistor 4 and the forward rotation power transistor 20b, in this sequence, so that the DC motor 1 is driven to forward rotate. In contrast, when the DC motor 1 is to be reversely rotated, the PWM signal outputted from the PWM modulation circuit 71 is applied to the base of the reverse rotation power transistor 20c, and a continuous signal for controlling the motor by which the reverse rotation power transistor 20d is continuously turned on is applied to the base of the reverse rotation power transistor 20d. In this case, therefore, each time when the reverse rotation power transistor 20c is turned on in response to the PWM signal, a current flows through the main power supply 5, the fail-safe relay circuit 6, the reverse rotation power transistor 20c, the second current detection resistor 4, the DC motor 1, the first current detection resistor 3 and the reverse rotation power transistor 20d, in this sequence, so that the DC motor 1 is driven to reversely rotate. In the both cases, the driving force is regulated by the duty ratio of the PWM signal.

In the control system of the thus configured electric power steering apparatus, when a ground fault occurs at point P in the DC motor 1 driven to rotate in the forward direction, for example, the current flowing through the first current detection resistor 3 increases, and in contrast that flowing through the second current detection resistor 4 decreases to approximately zero. Namely, the current value detected by the first current detection circuit 30 increases in the manner of time-lag of first order in accordance with the electrical time constant of the DC motor 1, and the current value detected by the second current detection circuit 40 decreases to approximately zero. When a ground fault occurs at point Q in the DC motor 1 driven to rotate in the reverse direction, for example, the current flowing through the second current detection resistor 4 increases, and in contract that flowing through the first current detection resistor 3 decreases to approximately zero. Namely, the current value detected by the second current detection circuit 40 increases in the manner of time-lag of first order in accordance with the electrical time constant of the DC motor 1, and the current value detected by the first current detection circuit 30 decreases to approximately zero.

When a ground fault occurs in the DC motor 1, the current values detected by the first and second current detection circuits 30 and 40 change as described above. Hence, the control unit 7 monitors the DC motor 1 on the basis of the detection results of the first and second current detection circuits 30 and 40, and, when the ground fault of the DC motor 1 is detected, performs the above-described fail-safe control.

Figure 4:
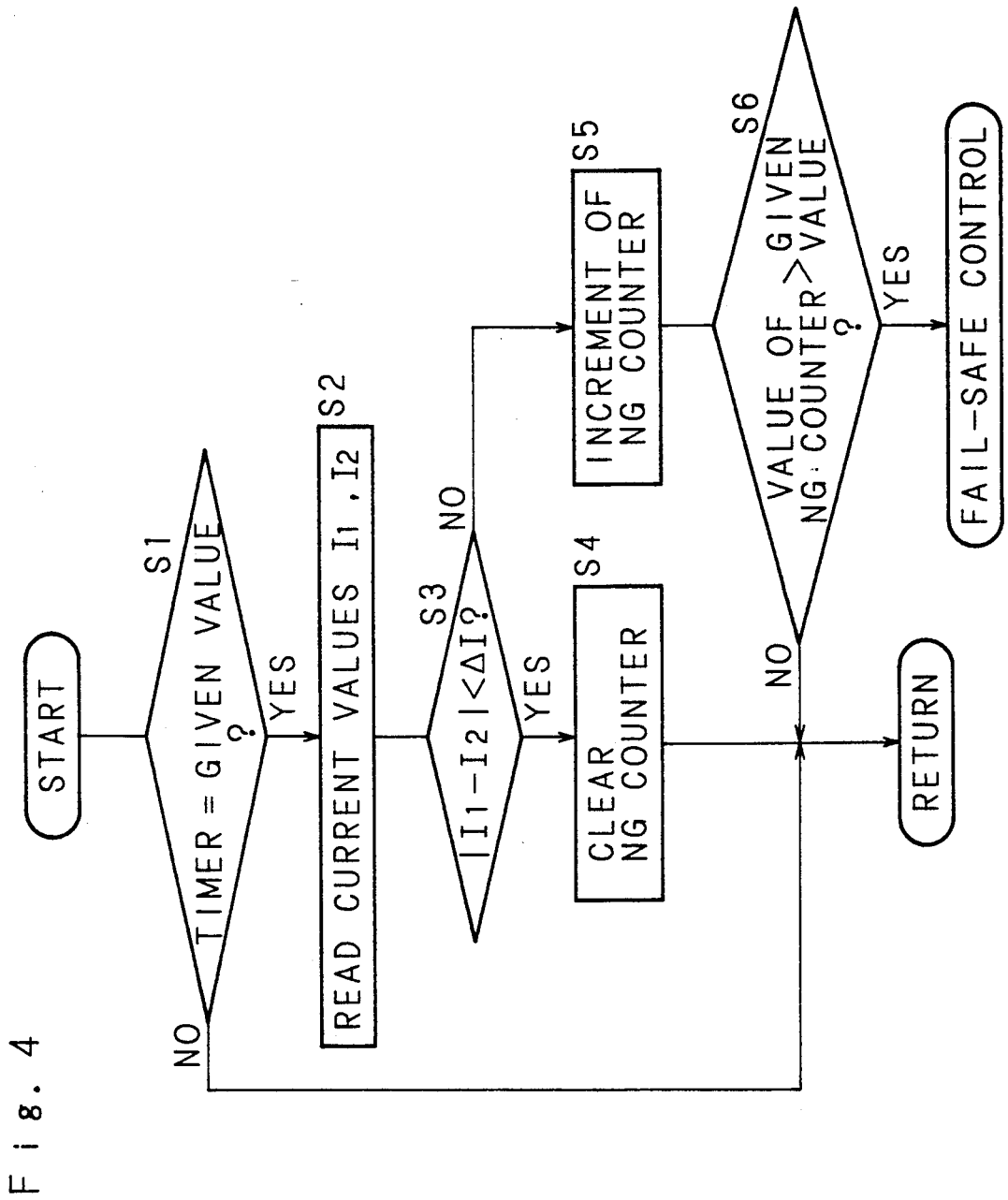
FIG. 4 is a flowchart illustrating the procedures of monitoring and controlling a ground fault of a DC motor which is conducted in a control unit.

Then, the method of monitoring and controlling a ground fault which is performed on the DC motor 1 by the control unit 7 will be described. FIG. 4 is a flowchart illustrating the procedure of the monitor and control for a ground fault which is conducted in the control unit 7.

At first, it is judged whether or not the contents of a timer which defines the calculation period have reached a given value (step S1). When it is judged that the contents of the timer have not yet reached the given value, the process performs the return operation. In contrast, when it is judged that the contents of the timer have reached the given value, the detected current value $I_1$ of the first current detection circuit 30 and the detected current value $I_2$ of the second current detection circuit 40 are read in (step S2). Then, the absolute value of the difference between the read-in detected current values $I_1$ and $I_2$ is obtained, and it is judged whether or not the obtained absolute value is smaller than a predetermined threshold value $\Delta I$ (step S3). When it is judged that the absolute value is smaller than the threshold value $\Delta I$ or when no ground fault occurs in the DC motor 1, the contents of an NG counter which conducts the count for the operation of the fail-safe relay circuit 6 are cleared (step S4).

In contrast, when it is judged that the absolute value is not smaller than the threshold value $\Delta I$ or when a ground fault occurs in the DC motor 1, the value of the NG counter is increased by one (step S5), and it is judged whether or not the value of the NG counter exceeds a given value (step S6). When it is judged in step S6 that the value of the NG counter does not exceed the given value, the process performs the return operation. In contrast, when it is judged in step S6 that the NG counter exceeds the given value, the fail-safe control described above is executed.

Figure 5:
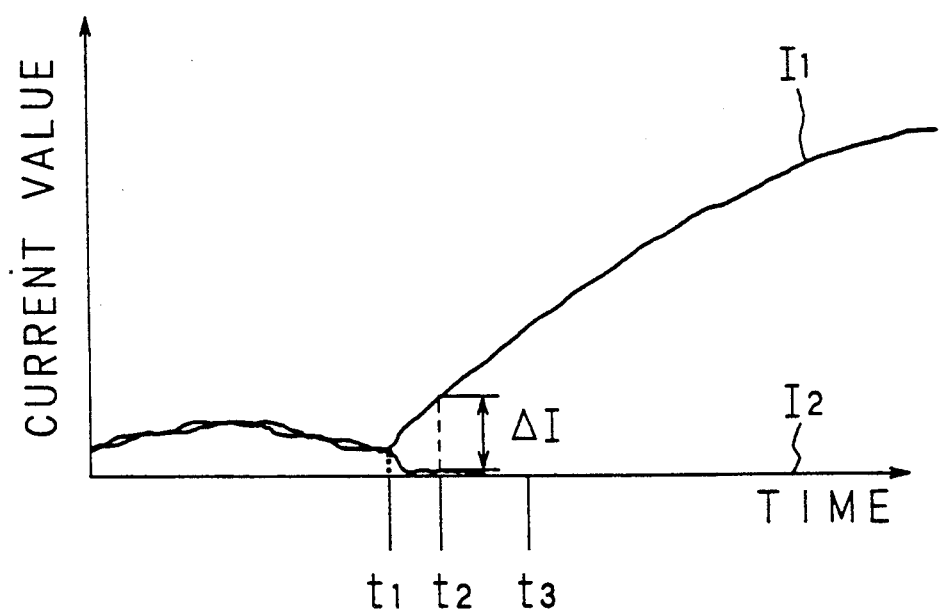
FIG. 5 is a graph illustrating the variation of current value which is detected by first and second current detection circuits when a ground fault occurs in a DC motor driven to rotate in forward direction.

FIG. 5 is a graph illustrating the variation of the detected current value $I_1$ of the first current detection circuit 30 and the detected current value $I_2$ of the second current detection circuit 40 which are obtained when a ground fault occurs at point P of FIG. 3 in the DC motor 1 driven to rotate in forward direction. The graph in which detected current value is plotted as ordinate and the elapsed time as abscissa shows the relationship between them. In FIG. 5, a ground fault of the DC motor 1 occurs at time $t_1$, and after the occurrence of the ground fault the detected current value $I_1$ increases in the manner of timelag of first order in accordance with the electrical time constant of the DC motor 1, and the detected current value $I_2$ rapidly decreases to zero. The absolute value of the difference between the detected current values $I_1$ and $I_2$ reaches the threshold value $\Delta I$ at time $t_2$. At time $t_3$ when the absolute value has continued to be equal to or greater than the threshold value $\Delta I$ for the predetermined period of time, the fail-safe control is performed.

Figure 1:
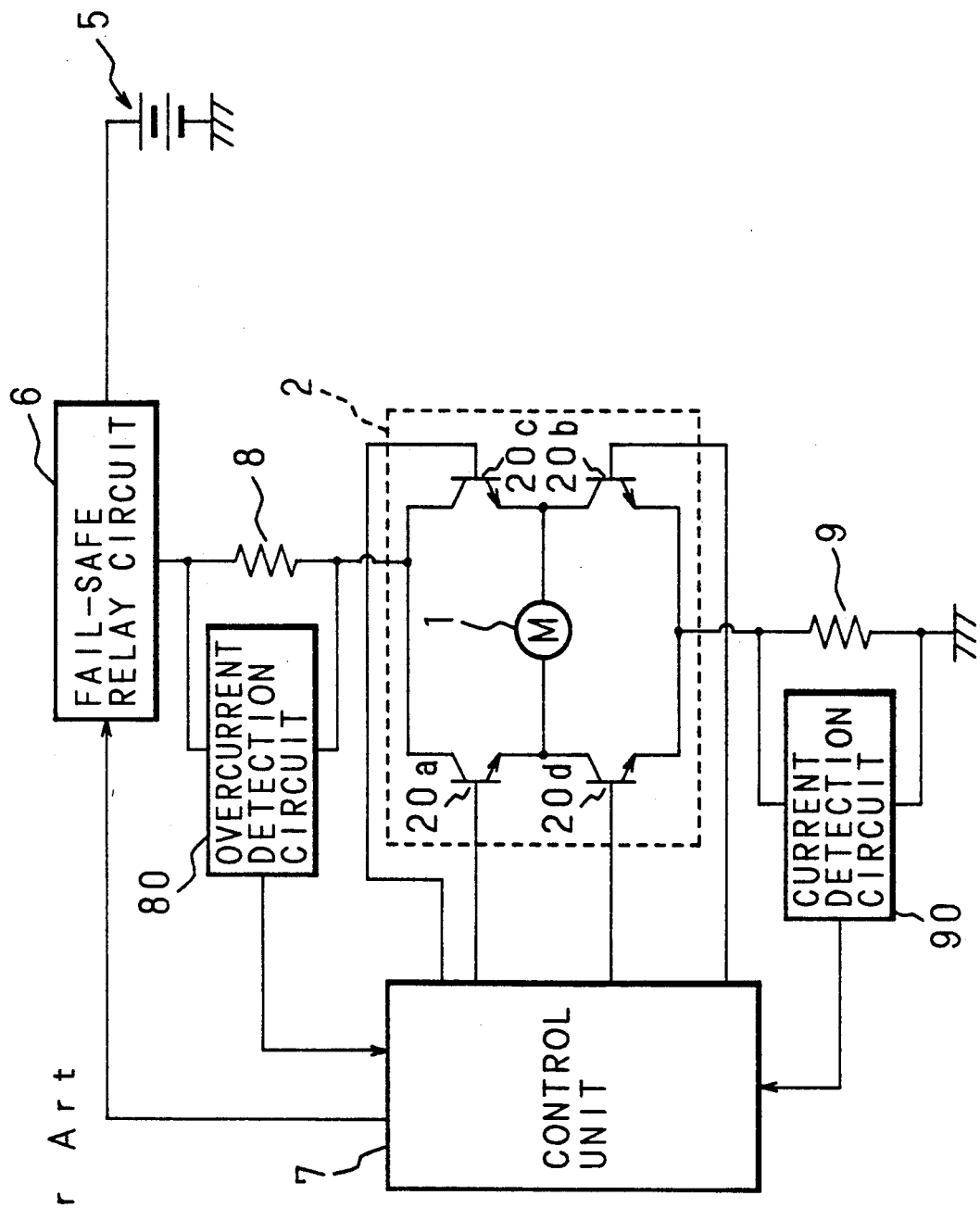
FIG. 1 is a schematic block diagram illustrating the configuration of a control system of a conventional electric power steering apparatus.
Figure 2:
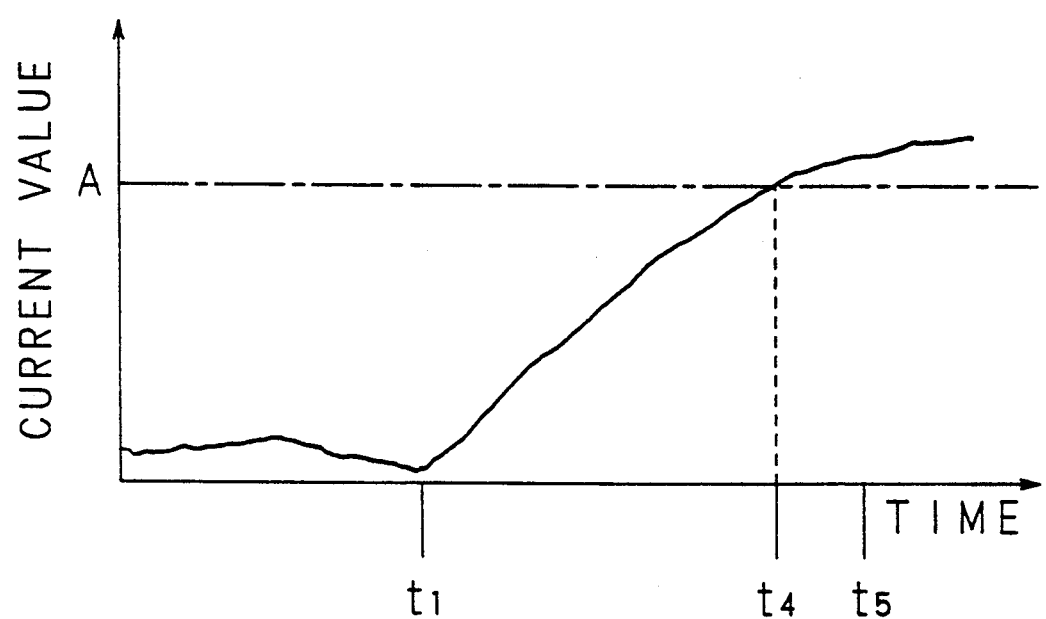
FIG. 2 is a graph illustrating the variation of current value which is detected by an overcurrent detection circuit when a ground fault occurs in a DC motor.

The scale of the time axis of FIG. 5 is substantially the same as that of FIG. 2 described above. When comparing FIG. 5 with FIG. 2, therefore, it is apparent that the apparatus of the invention can detect a ground fault of the DC motor 1 more rapidly than the conventional apparatus. When the detection of an abnormal state of the DC motor 1 is performed on the basis of the difference between the current flowing into the DC motor 1 and that flowing out therefrom in this way, an abnormal state of the DC motor 1 due to a ground fault can be detected in a short period of time because the current flowing out from the DC motor 1 rapidly decreases and hence this difference becomes large in a short period of time.

Figure 6:
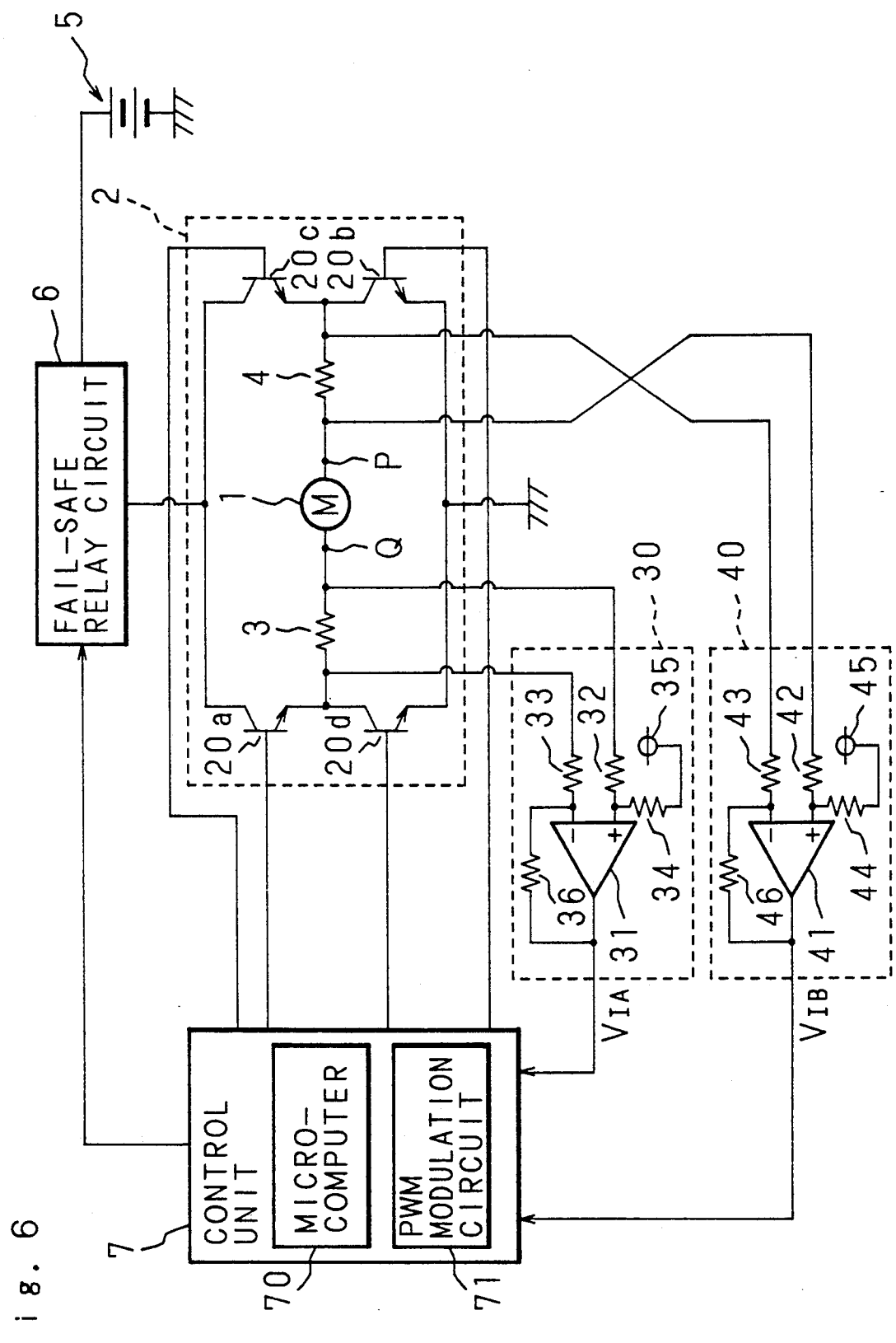
FIG. 6 is a schematic block diagram illustrating the configuration of another control system of an electric power steering apparatus according to the invention.

Next, another embodiment of the invention will be described. FIG. 6 is a schematic block diagram illustrating the configuration of the control system of another embodiment of the invention. In FIG. 6, components corresponding to those of FIG. 3 are designated by the same reference numerals, and their description is omitted.

The control system of FIG. 6 is characterized in the first and second current detection circuits 30 and 40. The first current detection circuit 30 has a configuration in which the positive input terminal of an amplifier 31 is connected through a resistor 32 to one terminal (terminal connected to the side of the DC motor 1) of the first current detection resistor 3, the negative input terminal of the amplifier 31 is connected through a resistor 33 to the other terminal of the first current detection resistor 3, the positive input terminal is connected also to an offset power supply 35 through a resistor 34, and the output terminal and negative input terminal of the amplifier 31 are connected to each other via a resistor 36. The first current detection circuit 30 detects the voltage across the first current detection resistor 3 and supplies the detection result (output voltage $V_{IA}$ of the amplifier 31) to the control unit 7 as information indicative of the current flowing into or flowing out from the DC motor 1. On the other hand, the second current detection circuit 40 has a configuration in which the positive input terminal of an amplifier 41 is connected through a resistor 42 to one terminal (terminal connected to the side of the DC motor 1) of the second current detection resistor 4, the negative input terminal of the amplifier 41 is connected through a resistor 43 to the other terminal of the second current detection resistor 4, the positive input terminal is connected also to an offset power supply 45 through a resistor 44, and the output terminal and negative input terminal of the amplifier 41 are connected to each other via a resistor 46. The second current detection circuit 40 detects the voltage across the second current detection resistor 4 and supplies the detection result (output voltage $V_{IB}$ of the amplifier 41) to the control unit 7 as information indicative of the current flowing into or flowing out from the DC motor 1. The offset power supplies 35 and 45 of the first and second current detection circuits 30 and 40 have a common power supply source.

Figure 7:
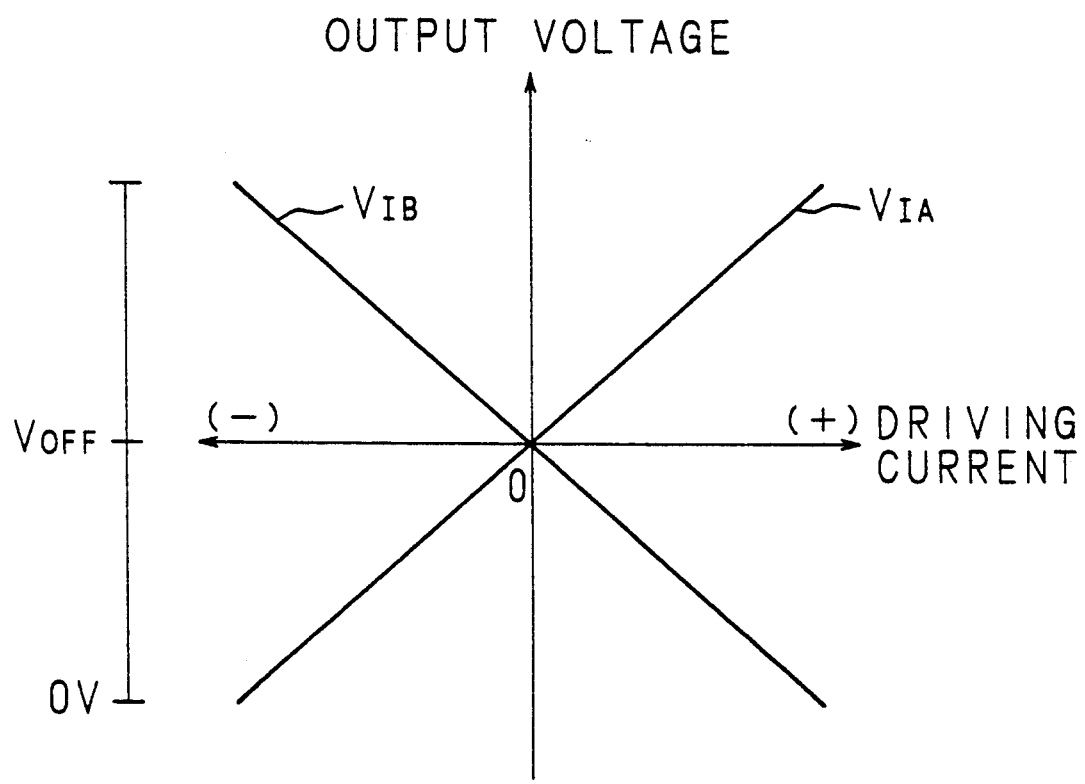
FIG. 7 is a graph showing the detection characteristic of the first and second current detection circuits.

Next, the detection characteristics of the first and second current detection circuits 30 and 40 will be described. FIG. 7 is a graph showing the detection characteristics of the first and second current detection circuits 30 and 40. In the graph, the output voltage $V_{IA}$ of the amplifier 31 and the output voltage $V_{IA}$ of the amplifier 41 are plotted as ordinate and the value of the driving current (flowing-in or flowing-out current) of the DC motor 1 as abscissa, so as to show the relationship between them. The value of the driving current of the DC motor 1 is positive when the driving current flows in one direction, and negative when it flows in the opposite direction. The state wherein the output voltages $V_{IA}$ and $V_{IB}$ are equal to an offset voltage $V_{OFF}$ is the state wherein no driving current of the DC motor 1 flows.

As shown in FIG. 7, owing to the above-described circuit structure, the detection characteristics of the first current detection circuit 30 are indicated by a line of positive gradient ($V_{IA}$ in the figure), and those of the second current detection circuit 40 are indicated by a line of negative gradient ($V_{IB}$ in the figure). In this way, between the detection characteristics of the first current detection circuit 30 and those of the second current detection circuit 40 there is a relationship of reverse polarity. In the first and second current detection circuits 30 and 40 having such detection characteristics, when the power supply voltage is lowered, the detection characteristics of both the first and second current detection circuits 30 and 40 change because the offset power supplies 35 and 45 of the first and second current detection circuits 30 and 40 have a common power supply source.

Figure 8:
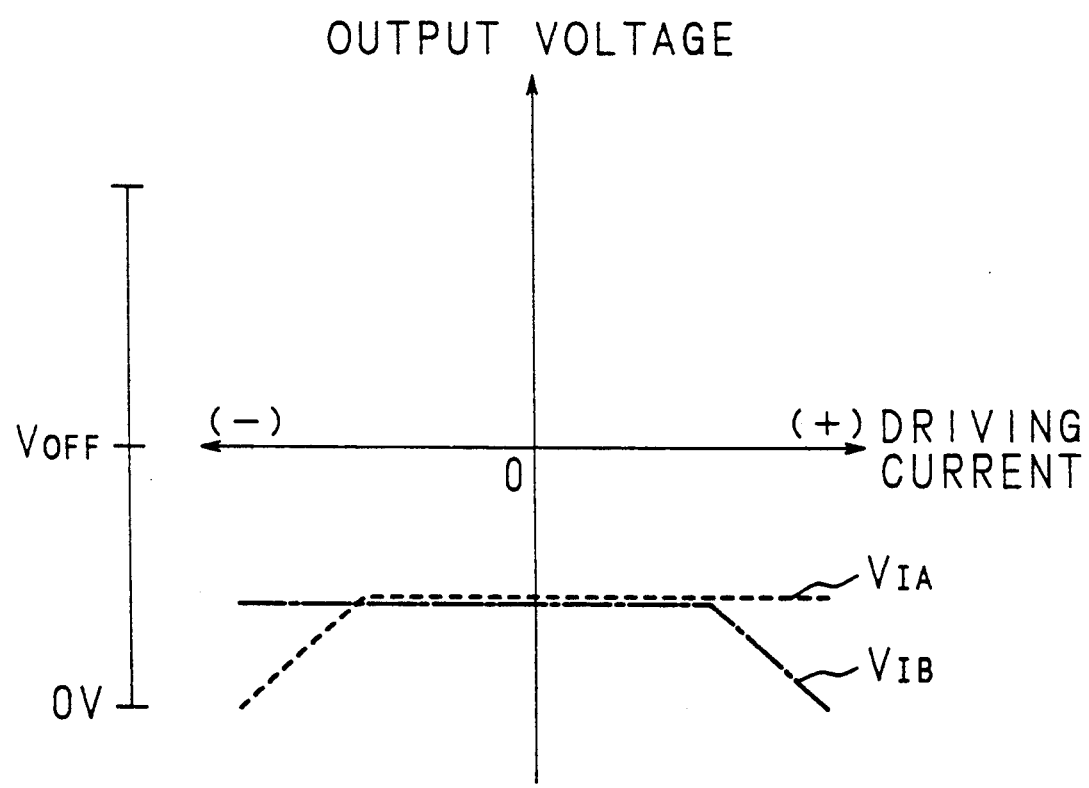
FIG. 8 is a graph showing the detection characteristic of the first and second current detection circuits which is obtained when the power supply voltage is lowered.

FIG. 8 is a graph showing the detection characteristics of the first and second current detection circuits 30 and 40 which are obtained when the power supply voltage is lowered. The ordinate and abscissa of the graph are the same as those of FIG. 7. In FIG. 8, the output voltage $V_{IA}$ of the first current detection circuit 30 and the output voltage $V_{IB}$ of the second current detection circuit 40 are indicated by a broken line and a one-dot chain line, respectively. Since the values of the output voltages $V_{IA}$ and $V_{IB}$ depend on the power supply voltage, in the case that the power supply voltage is lowered, the detection characteristics of the first and second current detection circuits 30 and 40 appear in such a manner that the output voltages $V_{IA}$ and $V_{IB}$ are saturated at a lower level, respectively.

When the power supply voltage is lowered, the security of the electric power steering apparatus is impaired in this way. Therefore, it is required to perform the aforementioned fail-safe control so as to prevent the security from being impaired. Since the first and second current detection circuits 30 and 40 having the circuit structures described above have the detection characteristics which are different from each other in polarity, when the power supply voltage is lowered, the difference between the detected current values which are respectively represented by their output voltages $V_{IA}$ and $V_{IB}$ becomes large. This allows the state in which the absolute value of the difference between the detected current values $I_1$ and $I_2$ is not smaller than the threshold value $\Delta I$, to be continued for the predetermined period of time (i.e., YES in step S6 of FIG. 4), so that the fail-safe control is executed, thereby preventing the security from being impaired.

The thus configured electric power steering apparatus of this embodiment can detect the voltage drop of the power supply in addition to the early detection of a ground fault which was described in conjunction with the former embodiment. According to this embodiment, therefore, it is possible to realize an electric power steering apparatus of very high security.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus which assists a steering power by an electric motor, comprising:
   first current detection means for detecting a current flowing into said electric motor;
   second current detection means for detecting a current flowing out from said electric motor;
   means for obtaining the difference between the currents detected by said first and second current detection means;
   abnormality detection means for detecting an abnormality of said electric power steering apparatus on the basis of the obtained current difference; and
   inhibition means for, when the abnormality is detected, inhibiting said electric motor from assisting the steering power.

2. An electric power steering apparatus according to claim 1, wherein said first current detection means comprises a resistor connected to said electric motor, and a circuit for detecting a current flowing through said resistor.

3. An electric power steering apparatus according to claim 1, wherein said second current detection means comprises a resistor connected to said electric motor, and a circuit for detecting a current flowing through said resistor.

4. An electric power steering apparatus according to claim 1, wherein said abnormality detection means compares the absolute value of the obtained current difference with a given value.

5. An electric power steering apparatus according to claim 4, wherein said abnormality detection means detects an abnormality of said electric power steering apparatus at the time when a state in which the absolute value of the obtained current difference is not smaller than said given value has continued for a predetermined period of time.

6. An electric power steering apparatus according to claim 1, wherein said abnormality detection means detects a ground fault of said electric motor.

7. An electric power steering apparatus according to claim 1, further comprising a power supply for supplying an electric power for driving said electric motor, and a fail-safe relay circuit for controlling the supply of electric power from said power supply to said electric motor.

8. An electric power steering apparatus according to claim 7, wherein, when the abnormality is detected, said inhibition means makes a relay contact of said fail-safe relay circuit off, thereby cutting off the supply of electric power to said electric motor.

9. An electric power steering apparatus which assists a steering power by an electric motor, comprising:
   a first resistor connected to said electric motor;
   a second resistor connected to said electric motor;
   first current detection means for detecting a current flowing through said first resistor;
   second current detection means for detecting a current flowing through said second resistor;
   means for obtaining the difference between the currents detected by said first and second current detection means;
   abnormality detection means for detecting an abnormality of said electric power steering apparatus on the basis of the obtained current difference; and
   inhibition means for, when the abnormality is detected, inhibiting said electric motor form assisting the steering power.

10. An electric power steering apparatus according to claim 9, wherein said abnormality detection means compares the absolute value of the obtained current difference with a given value.

11. An electric power steering apparatus according to claim 10, wherein said abnormality detection means detects an abnormality of said electric power steering apparatus at the time when a state in which the absolute value of the obtained current difference is not smaller than said given value has continued for a predetermined period of time.

12. An electric power steering apparatus according to claim 9, wherein said abnormality detection means detects a ground fault of said electric motor.

13. An electric power steering apparatus according to claim 9, further comprising a power supply for supplying an electric power for driving said electric motor, and a fail-safe relay circuit for controlling the supply of electric power from said power supply to said electric motor.

14. An electric power steering apparatus according to claim 13, wherein, when the abnormality is detected, said inhibition means makes a relay contact of said fail-safe relay circuit off, thereby cutting off the supply of electric power to said electric motor.

15. An electric power steering apparatus which assists a steering power by an electric motor, comprising:
   a first resistor connected to said electric motor;
   a second resistor connected to said electric motor;
   first voltage detection means for detecting voltage characteristics appearing at the both ends of said first resistor;

second voltage detection means for detecting voltage characteristics appearing at the both ends of said second resistor;

abnormality detection means for detecting an abnormality of said electric power steering apparatus on the basis of the detection results obtained by said first and second voltage detection means; and inhibition means for, when the abnormality is detected, inhibiting said electric motor from assisting the steering power.

16. An electric power steering apparatus according to claim 15, wherein said first voltage detection means comprises: an amplifier, a positive input terminal of said amplifier being connected to one terminal of said first resistor which is at the side of said electric motor, a negative input terminal of said amplifier being connected to the other terminal of said first resistor, an output terminal of said amplifier being connected to said negative input terminal; and an offset power supply which is connected to said positive input terminal of said amplifier, and said second voltage detection means comprises: an amplifier, a positive input terminal of said amplifier being connected to one terminal of said second resistor which is at the side of said electric motor, a negative input terminal of said amplifier being connected to the other terminal of said second resistor, an output terminal of said amplifier being connected to said negative input terminal; and an offset power supply which is connected to said positive input terminal of said amplifier.

17. An electric power steering apparatus according to claim 16, wherein a power supply source of said offset power supply of said first voltage detection means is the same as a power supply source of said offset power supply of said second voltage detection means.

18. An electric power steering apparatus according to claim 15, further comprising a power supply for supplying an electric power for driving said electric motor, and a fail-safe relay circuit for controlling the supply of electric power from said power supply to said electric motor.

19. An electric power steering apparatus according to claim 18, wherein said abnormality detection means detects a ground fault of said electric motor and a voltage drop of said power supply.

20. An electric power steering apparatus according to claim 19, wherein, when the abnormality is detected, said inhibition means makes a relay contact of said fail-safe relay circuit off, thereby cutting off the supply of electric power to said electric motor.

* * * * *